United States Patent
Seko (10) Patent No.: US 8,446,611 B2
(45) Date of Patent: May 21, 2013

(54) IMAGE FORMING APPARATUS, COMPUTER READABLE RECORDING MEDIUM, AND METHOD FOR IMPROVING THE DETECTION OF INPUT IMAGE DATA FORMATS

(75) Inventor: Toshihiro Seko, Osaka (JP)

(73) Assignee: KYOCERA Document Solutions Inc. (JP)

( * ) Notice: Subject to any disclaimer, the term of this patent is extended or adjusted under 35 U.S.C. 154(b) by 369 days.

(21) Appl. No.: 12/887,153

(22) Filed: Sep. 21, 2010

(65) Prior Publication Data

US 2011/0075185 A1    Mar. 31, 2011

(30) Foreign Application Priority Data

Sep. 25, 2009 (JP) ................................ 2009-220503

(51) Int. Cl.
*G06K 15/00* (2006.01)

(52) U.S. Cl.
USPC .................... 358/1.14; 358/1.15; 358/426.02; 358/426.12

(58) Field of Classification Search
USPC .............................................. 358/1.14, 1.15
See application file for complete search history.

(56) References Cited

U.S. PATENT DOCUMENTS

| 2004/0196494 A1* | 10/2004 | Binder ......................... 358/1.15 |
| 2005/0225789 A1 | 10/2005 | Ferlitsch |
| 2009/0089533 A1* | 4/2009 | Nogawa et al. ............... 711/171 |

FOREIGN PATENT DOCUMENTS

| JP | 08-115179 | 5/1996 |
| JP | 09-323464 | 12/1997 |
| JP | 2005-196751 | 7/2005 |
| JP | 2007-060336 | 3/2007 |
| JP | 2008-234119 | 10/2008 |
| JP | 2008-234506 | 10/2008 |

* cited by examiner

*Primary Examiner* — Marivelisse Santiago Cordero
*Assistant Examiner* — Moustapha Diaby
(74) *Attorney, Agent, or Firm* — McDonnell Boehnen Hulbert & Berghoff LLP (57) ABSTRACT

An image forming apparatus includes data analyzing units configured to respectively interpret image data in accordance with different corresponding data formats, a drawing processing unit configured to execute a drawing process on the basis of a result of the interpretation, a data format determining unit configured to determine the data format of input image data, to cause a particular data analyzing unit corresponding to the data format to interpret the input image data, and to cause another data analyzing unit to interpret the input image data responsive to a format error being generated while the input image data is being processed using the particular data analyzing unit or the drawing processing unit.

16 Claims, 10 Drawing Sheets

IMAGE FORMING APPARATUS, COMPUTER READABLE RECORDING MEDIUM, AND METHOD FOR IMPROVING THE DETECTION OF INPUT IMAGE DATA FORMATS

CROSS-REFERENCE TO RELATED APPLICATIONS

This application is based upon and claims the benefit of priority from the corresponding Japanese Patent Application No. 2009-220503, filed in the Japan Patent Office on Sep. 25, 2009, the entire contents of which is incorporated herein by reference.

BACKGROUND

1. Technical Field

The present disclosure relates to an image forming apparatus, a computer readable recording medium and a method for improving the detection of input image data formats.

2. Description of the Related Art

As typical data formats of image data (print data) that an image forming apparatus having a printing function such as a printer, an MFP (Multi Functional Peripheral), or the like is capable of interpreting, PDL (Page Description Language) formats such as, for example, PS (PostScript), PCL (Printer Control Language), and the like are used.

The number of image forming apparatus of the type that use electronic document formats such as PDF (Portable Document Format) and XPS (XML Paper Specification), and mark-up languages such as HTML (HyperText Markup Language) and XML (Extensible Markup Language), as data formats of the input image data (print data) is increasing.

In an image forming apparatus that is capable of using image data of many data formats as mentioned above, a control code inherent to a vendor is embedded in the image data specifies the PDL format of the image data, or a user specifies the PDL format by operating the console of the image forming apparatus.

In addition, there is a technique that causes an image forming apparatus to analyze the header of received input image data to specify the PDL format of the input image data.

Figure 10:
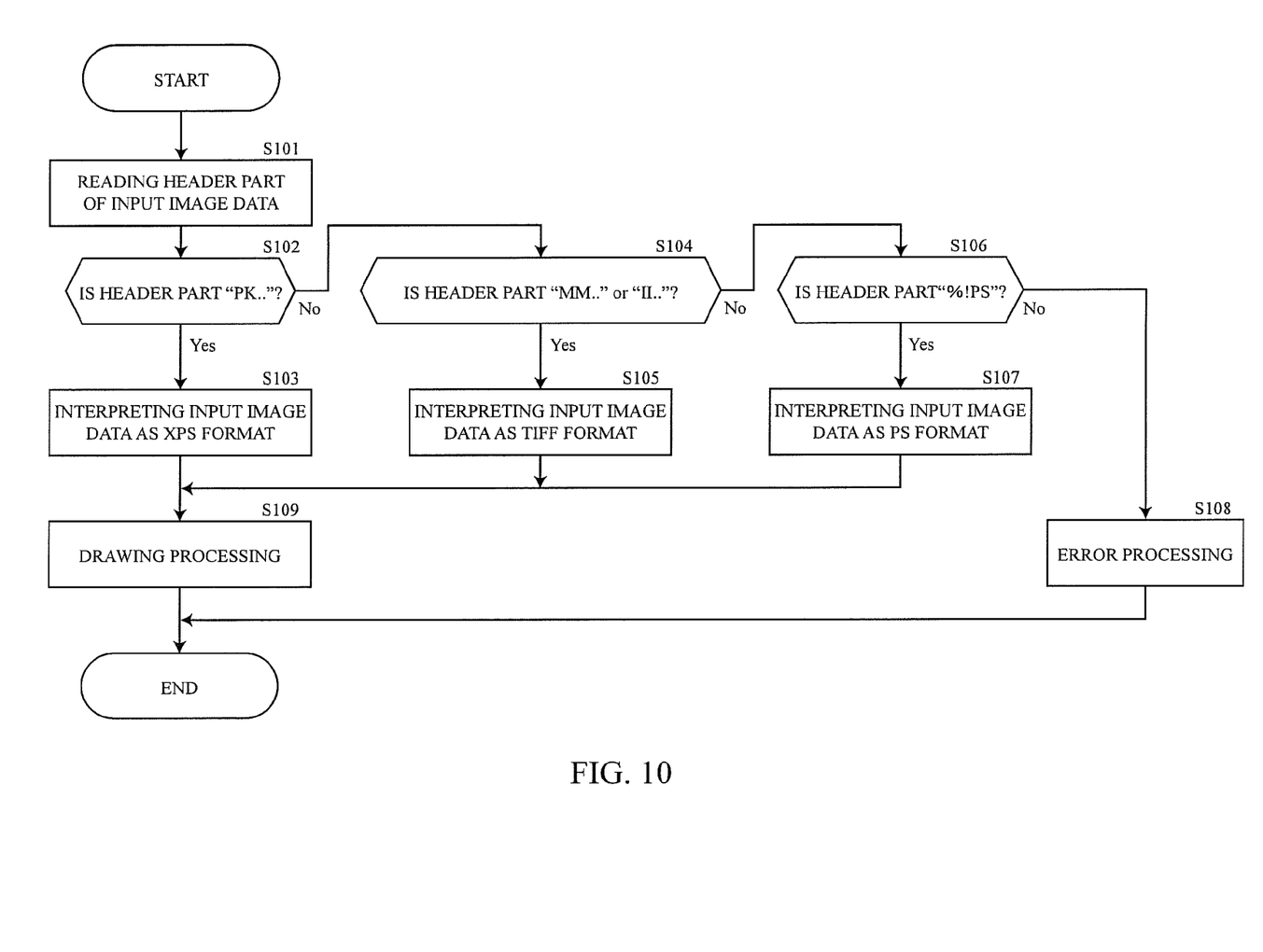
FIG. 10 shows a flowchart illustrating an example of a method of identifying the data format of input image data.

FIG. 10 is a flowchart illustrating an example of a method of specifying one of the XPS format, the TIFF (Tagged Image File Format) format, and the PS (PostScript) format as a data format of input image data.

As illustrated in FIG. 10, first, the header part of the input image data is read (step S101). Then, if the header part is 0x504B0304 ("PK . . . " in the ASCII character set) (step S102), it is interpreted that the input image data is of the XPS format (step S103). Or, if the header part is 0x4D4D002A ("MM . . . " in the ASCII character set) or 0x49492A00 ("II . . . " in the ASCII character set) (step S104), it is interpreted that the input image data is of the TIFF format (step S105). Or, if the header part is "%!PS" (step S106), it is interpreted that the input image data is of the PS format (step S107). On the other hand, if the header part does not have any of the above mentioned identification codes, specification of the data format of the input image data is impossible and hence error processing is executed (step S108). As a result, the input image data is interpreted to be of the specified data format and a drawing processing is executed on the basis of the interpretation (step S109) and raster data for use in printing is generated.

In the case that the data format of the input image data is automatically specified on the basis of only the code of the header part of the input image data as described above, if the header part of the input image data is not correctly described or the header part is broken in the course of communication, error processing may be executed when the input image data is interpreted.

In addition, if the header part of text data or binary data (that is, data that will never be input image data) to which the image forming apparatus does not conform unexpectedly matches the header part of the input image data to which the image forming apparatus conforms, the data may be incorrectly interpreted as the input image data. As a result, a large number of pages of meaningless data may be printed or an unexpected malfunction may be generated.

SUMMARY

An image forming apparatus according to an embodiment of the present disclosure includes a plurality of data analyzing units, a drawing processing unit, and a data format determining unit. The data analyzing units are configured to respectively interpret image data in accordance with different corresponding data formats. The drawing processing unit is configured to execute a drawing processing on the basis of a result of an interpretation executed using the plurality of data analyzing units. The data format determining unit is configured to: determine an initial estimated data format of the input image data, cause a particular data analyzing unit of the plurality of data analyzing units corresponding to the initial estimated data format to interpret the input image data, and cause another data analyzing unit of the plurality of data analyzing units to interpret the input image data responsive to a format error being generated while the input image data is being processed using the particular data analyzing unit or the drawing processing unit.

A computer readable recording medium according to an embodiment of the present disclosure stores print processing program code to be executed by a computer of an image forming apparatus. The print processing program code includes five sub-program codes. The first sub-program code causes the computer to respectively interpret image data in accordance with a plurality of different data formats. The second sub-program code causes the computer to execute drawing processing on the basis of a result of the first sub-program code. The third sub-program code causes the computer to determine an initial estimated data format of input image data. The fourth sub-program code causes the computer to interpret the input image data as a particular one of the plurality of different data formats in accordance with the initial estimated data format. The fifth sub-program code causes the computer to interpret the input image data as another data format of the plurality of different data formats responsive to a format error being generated while the input image data is being processed as the particular data format by the first sub-program code or the second sub-program code.

A print processing method according to an embodiment of the present disclosure includes (i) a plurality of data analyzing units respectively interpreting image data in accordance with different corresponding data formats, (ii) a drawing processing unit executing a drawing process on the basis of a result of an interpretation executed using the plurality of data analyzing units, and (iii) a data format determining unit determining an initial estimated data format of input image data, causing a particular data analyzing unit of the plurality of data analyzing units corresponding to the initial estimated data format to interpret the input image data, and causing another data analyzing unit of the plurality of data analyzing units to interpret the input image data responsive to a format error being generated while the input image data is being processed using the particular data analyzing unit or the drawing processing unit.

Additional features and advantages are described herein, and will be apparent from the following Detailed Description and the figures.

DETAILED DESCRIPTION

Next, embodiments of the present disclosure will be described with reference to the accompanying drawings.

Figure 1:
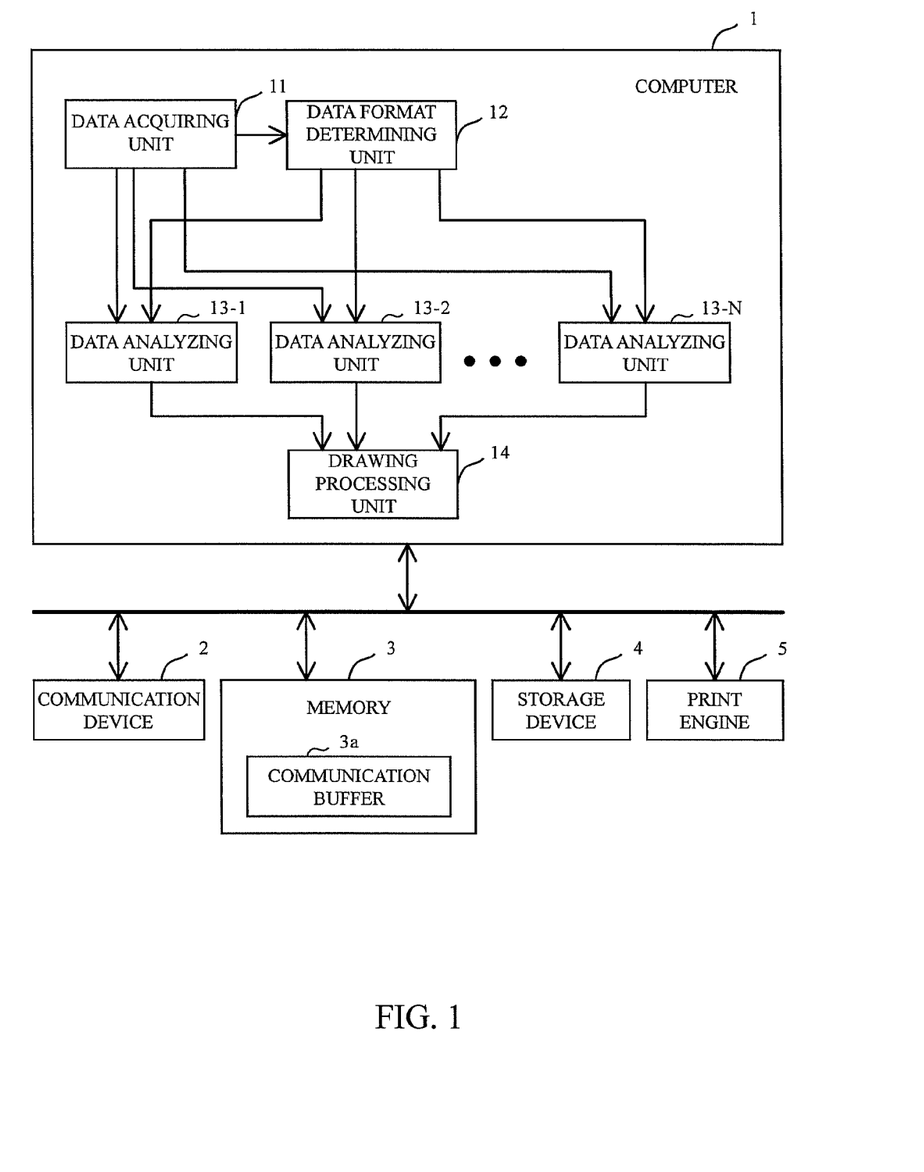
FIG. 1 shows a block diagram of an image forming apparatus according to an embodiment of the present disclosure.

FIG. 1 shows a block diagram illustrating an example configuration of an image forming apparatus according to an embodiment of the present disclosure. As illustrated in FIG. 1, the image forming apparatus includes computer 1, communication device 2, memory 3, storage device 4 and print engine 5. Computer 1, communication device 2, memory 3, storage device 4 and print engine 5 are connected with one another via a bus or the like so as to allow data communication with one another.

Communication device 2 is connected to a host device such as a personal computer or the like and receives input image data from the host device via a peripheral device interface such as a USB (Universal Serial Bus) interface, a parallel interface, or the like.

Memory 3 is a RAM (Random Access Memory) or the like and stores various pieces of data. Some storage areas in memory 3 are used as a communication buffer 3a that temporarily stores data that has been received from communication device 2.

Storage device 4 is a nonvolatile mass storage device such as a hard disk drive, a flash memory, or the like.

Print engine 5 is a device that prints an image on a print sheet on the basis of drawing data (raster data) that is generated from the input image data using computer 1.

Computer 1 is a device that executes program code (print processing program code or the like) involving the operation of the image forming apparatus according to an embodiment of the present disclosure.

Figure 2:
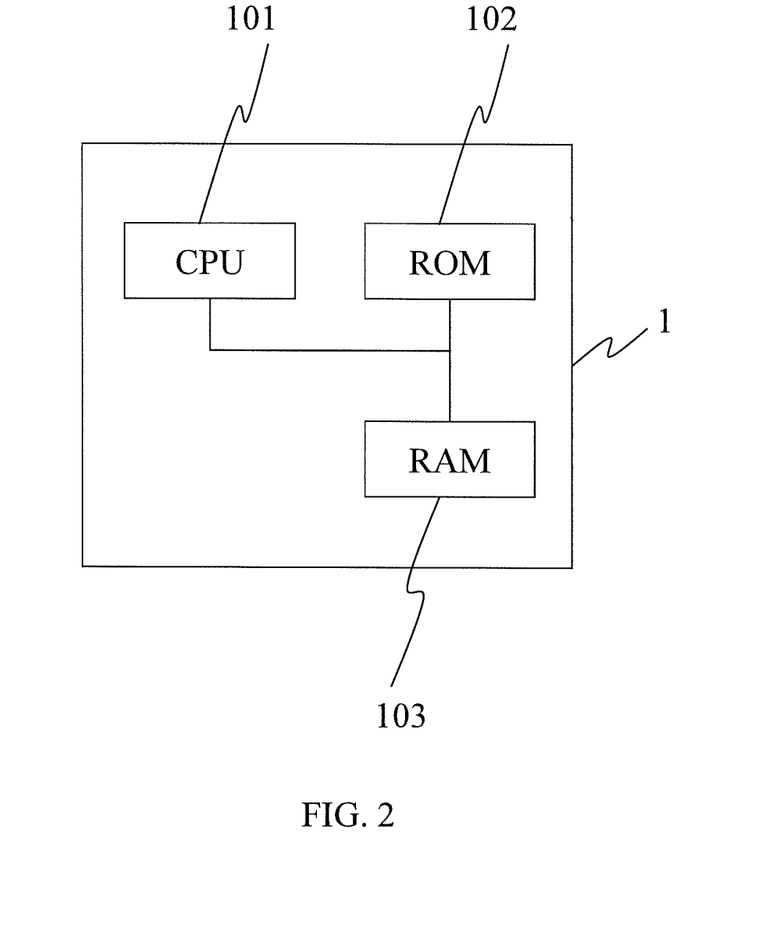
FIG. 2 shows an example hardware architecture of the computer illustrated in FIG. 1.

FIG. 2 shows an example hardware architecture of the computer illustrated in FIG. 1. As illustrated in FIG. 2, computer 1 includes CPU (Central Processing Unit) 101, ROM (Read Only Memory) 102, and RAM 103. CPU 101 is an arithmetic processing device that executes processing described in program code. ROM 102 is a nonvolatile memory that stores the program code and data. RAM 103 is a memory that temporarily stores the program code and data used when the program code is executed. Incidentally, memory 3 may be used as RAM 103. Computer 1 loads the print processing program code from ROM 102 to RAM 103 and executes program code using CPU 101 so as to function as a data acquiring unit 11, a data format determining unit 12, a plurality of data analyzing units 13-1 to 13-N, and a drawing processing unit 14.

Data acquiring unit 11 is controlled using data format determining unit 12 or data analyzing units 13-1 to 13-N to read the input image data from communication buffer 3a or storage device 4.

Data format determining unit 12 refers to the input image data to determine the data format of the input image data and causes data analyzing unit 13-$i$ ($i$=1, ..., N) corresponding to the data format of the input image data to interpret the input image data.

If the header part of the input image data matches the specific header code of one of a plurality of data formats, the data format determining unit 12 causes data analyzing unit 13-$i$ corresponding to the data format for the specific header code to interpret the input image data. If a format error has been generated while the input image data is being processed using data analyzing unit 13-$i$ or drawing processing unit 14, data format determining unit 12 causes another data analyzing unit 13-$j$ ($j \neq i$) of the plurality of data analyzing units 13-1 to 13-N to interpret the input image data. If a format error has been generated while the input image data is being processed using data analyzing unit 13-$j$, data format determining unit 12 causes further data analyzing unit 13-$k$ ($k$=1, ..., N and $k \neq i, j$) of the plurality of data analyzing units 13-1 to 13-N to interpret the input image data.

As described above, data format determining unit 12 switches, in succession, using data analyzing units 13-1 to 13-N and causes each to interpret the input image data until one of the data analyzing units 13-1 to 13-N completes without generating a format error. In one embodiment, all of the plurality of data analyzing units 13-1 to 13-N may attempt to interpret the input image data. Incidentally, the format error is a syntax error in the data format of the input image data.

Data analyzing units 13-1 to 13-N are processing units that respectively interpret image data of a plurality of data formats. For example, in the embodiment illustrated in the drawing, data analyzing units 13-1 to 13-N (N=4) may respectively correspond to the XPS format, the PDF format, the TIFF format, and the JPEG (Joint Photographic Experts Group) format.

Drawing processing unit 14 is a processing unit that executes a drawing processing on the basis of a result of the interpretation executed using data analyzing units 13-$i$ ($i$=1, ..., N). In the drawing processing, raster data for use in printing is generated.

Figure 3:
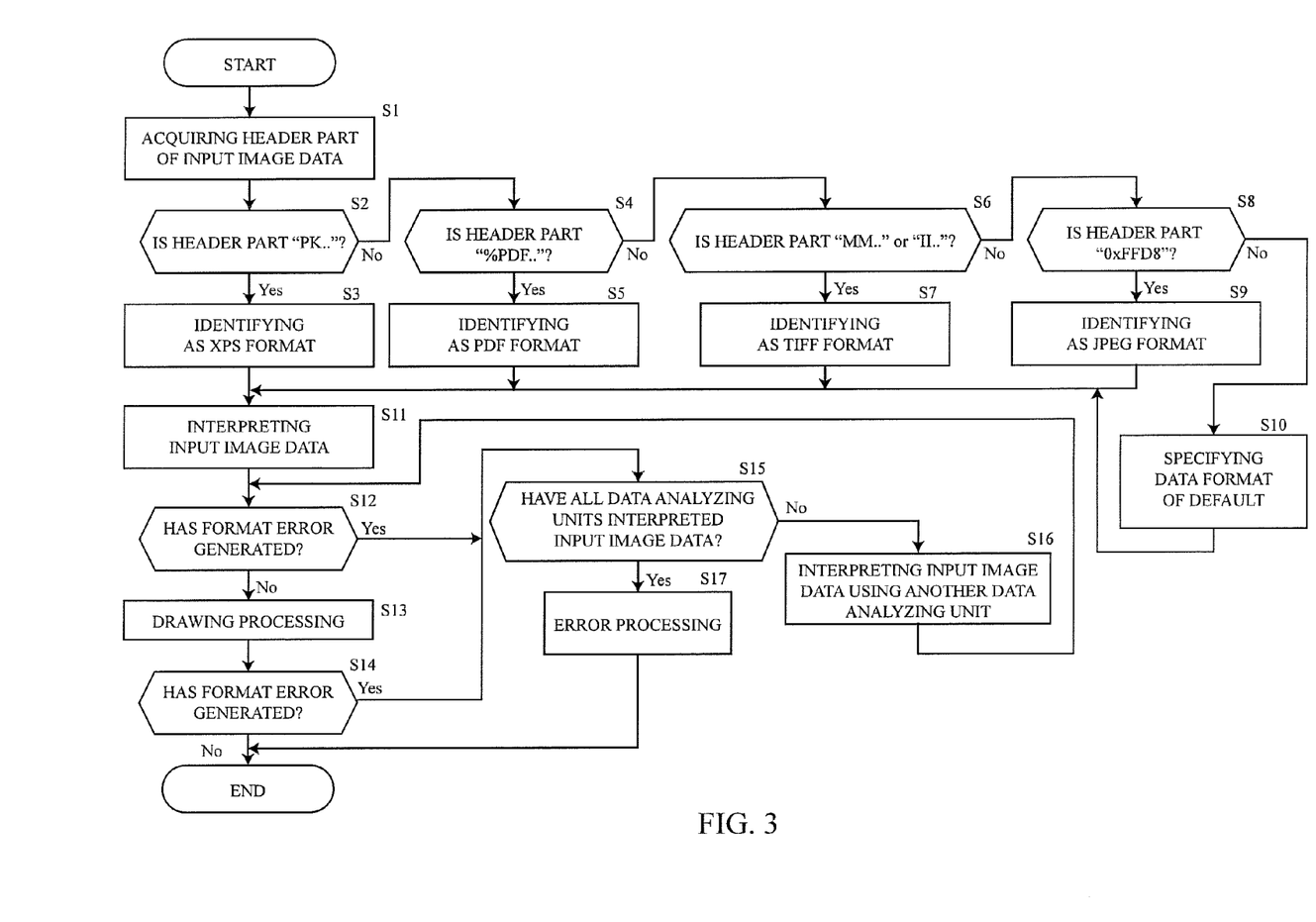
FIG. 3 shows a flowchart illustrating an example operation of an image forming apparatus according to an embodiment of the present disclosure.

Next, the operation of an image forming apparatus according to an embodiment of the present disclosure will be described. FIG. 3 shows a flowchart illustrating an example operation of the image forming apparatus according to an embodiment of the present disclosure.

The communication device has received input image data and stores the input image data into the communication buffer. Then, the data format determining unit controls the data acquiring unit to acquire the header part of the input image data from the communication buffer (step S1).

The data format determining unit determines whether the acquired data header part (the acquired header part of the data) is 0x504B0304 ("PK..." in the ASCII character set) (step S2). If the acquired data header part is determined to be 0x504B0304 ("PK..." in the ASCII character set), the data format determining unit identifies the input image data as the XPS format (step S3).

On the other hand, if the acquired data header part is determined not to be 0x504B0304 ("PK..." in the ASCII character set), the data format determining unit determines whether the acquired data header part is "% PDF" (step S4). If the acquired data header part is determined to be "% PDF", the data format determining unit identifies the input image data as the PDF format (step S5).

On the other hand, if the acquired data header part is determined not to be "% PDF", the data format determining unit determines whether the acquired data header part is 0x4D4D002A ("MM..." in the ASCII character set) or 0x49492A00 ("II..." in the ASCII character set) (step S6). If the acquired data header part is determined to be 0x4D4D002A ("MM..." in the ASCII character set) or 0x49492A00 ("II..." in the ASCII character set), the data format determining unit identifies the input image data as the TIFF format (step S7).

On the other hand, if the acquired data header part is determined not to be 0x4D4D002A ("MM..." in the ASCII character set) or 0x49492A00 ("II..." in the ASCII character set), the data format determining unit determines whether the acquired data header part is 0xFFD8 (step S8). If the acquired data header part is determined to be 0xFFD8, the data format determining unit identifies the input image data as the JPEG format (step S9).

On the other hand, if the acquired data header part is determined not to be 0xFFD8, the acquired data header part does not have any of the above mentioned identification codes and hence the data format determining unit specifies the data format of default as the data format of the input image data (step S10). The data format of default is selected from among the data formats that may be used in the image forming apparatus and is set in the apparatus (for example, the XPS format). For example, the data format determining unit may store the processing history of each piece of input image data into the storage device and may analyze the history to set the data format of the input image data that has been received last or the data format that is the most frequently used in respective pieces of input image data that have ever been received. As an alternative, a system administrator may set a default data format in advance in the image forming apparatus.

The data format determining unit identifies the data format of the input image data in the above mentioned manner and calls the data analyzing unit corresponding to the identified data format so as to cause it to interpret the input image data (step S11).

When a data interpretation processing executed using the data analyzing unit corresponding to the identified data format is terminated, the data format determining unit determines whether a format error has been generated while the data interpretation processing is being executed (step S12). If the format error has been generated while the data interpretation processing is being executed, the data analyzing unit generates a format error generation log. The data format determining unit determines whether the format error has been generated while the data interpretation processing is being executed depending on whether the data format error generation log is present.

If it has been determined that no format error has been generated while the data interpretation processing is being executed using the data analyzing unit, the data format determining unit causes the drawing processing unit to execute the drawing processing on the basis of the data interpretation executed using the data analyzing unit (step S13).

When the drawing processing executed using the drawing processing unit is terminated, the data format determining unit determines whether a format error has been generated while the drawing processing was being executed (step S14). For example, if the input image data includes bit map image data, for example, as in the case with the data of the TIFF format, interpretation of the data main body is not necessary for the data analyzing unit and hence determination is made mainly as to whether a format error has been generated while the drawing processing is being executed.

If no format error is generated while the data interpretation processing is executed and also while the drawing processing is executed, the raster image data for use in printing is normally generated and hence execution of the processing is terminated.

On the other hand, if it has been determined that a format error has been generated while the data interpretation processing is being executed or while the drawing processing is being executed (step S12 or S14), the data format determining unit determines first whether all of the data analyzing units have already respectively interpreted the input image data (step S15). If it has been found that some of the plurality of data analyzing units have not yet interpreted the input image data, the data format determining unit causes another data analyzing unit, that is, one of the data analyzing units that has not yet interpreted the input image data, to interpret the input image data (step S16). At the completion of the data interpretation processing executed using the another data analyzing unit, the data format determining unit executes the same processing as executed at the completion of the previous data interpretation processing (that is, the processing to be executed at step S12 and succeeding steps). Accordingly, if the format error has again been generated, the data interpretation processing is executed using a further data analyzing unit that has not yet interpreted the input image data.

If all of the data analyzing units have already interpreted the input image data at step S15, there exists no data analyzing unit that may normally interpret the input image data and hence the data format determining unit executes error processing (to display an error message or the like) (step S17) and terminates execution of the processing.

Thus, the input image data is interpreted using the data analyzing unit conforming to the data format of the input image data.

Next, the operation of each data analyzing unit will be described.

Figure 4:
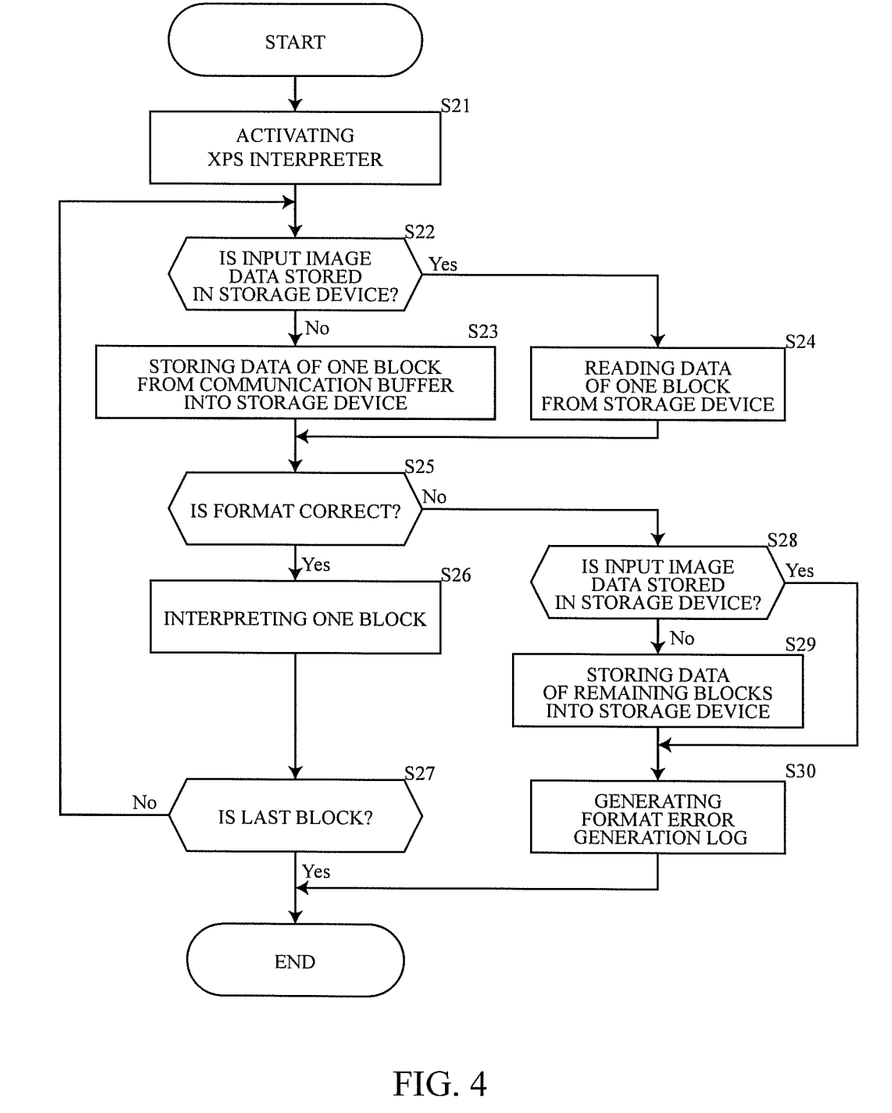
FIG. 4 shows a flowchart illustrating an example operation of a data analyzing unit for the XPS format in an image forming apparatus according to an embodiment of the present disclosure.

First, the operation of the data analyzing unit for the XPS format will be described. FIG. 4 shows a flowchart illustrating an example operation of the data analyzing unit for the XPS format in an image forming apparatus according to an embodiment of the present disclosure.

First, the data analyzing unit activates an XPS interpreter (step S21) and causes the XPS interpreter to interpret respective blocks of the input image data in order.

Here, the input image data of the XPS format will be described.

Figure 5:
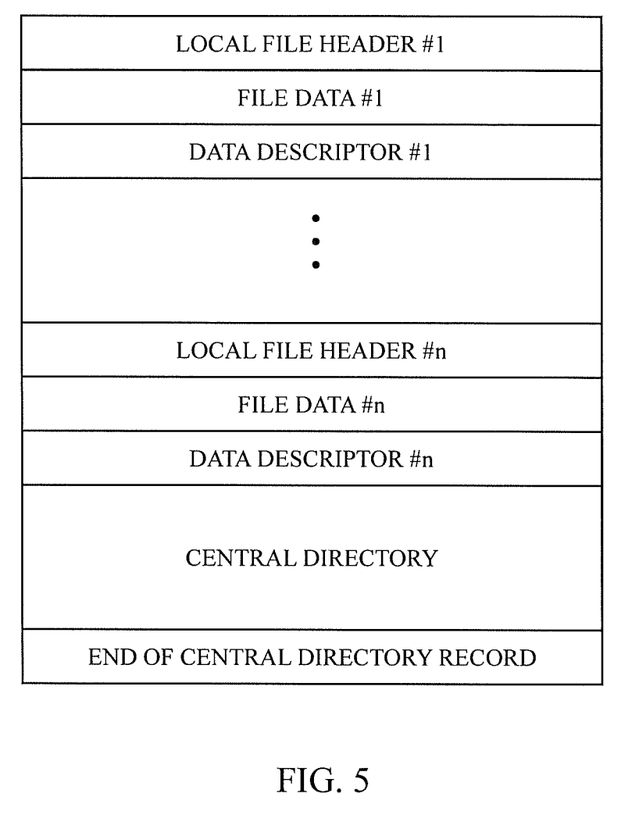
FIG. 5 shows an example of a data structure of the ZIP format.

The input image data of the XPS format is data that is compressed in the ZIP format. FIG. 5 shows a data structure of the ZIP format. As illustrated in FIG. 5, the data of the ZIP format includes one or more set(s) of Local File Header (the local file header), File Data (the file data), and Data Descriptor (the data descriptor), Central Directory (the central directory) and End Of Central Directory Record (the end of central directory record). The end of central directory record is situated at the trailing end of the ZIP data.

The central directory includes one or more file header(s) and a digital signature. The local file header, the file header(s) and the digital signature in the central directory, and the end of central directory record include signatures at their heads. The signature is 4-bytes and has a value that is inherent to each type of the field. The value of the signature of the local file header is 0x04034b50. The value of the signature of the file header in the central directory is 0x02014b50. The value of the signature of the digital signature in the central directory is 0x05054b50. And the value of the signature of the end of central directory record is 0x06054b50.

The length of each block is fixed. However, the length of the file data is variable and the size thereof is included in the local file header.

Therefore, the data analyzing unit controls the data acquiring unit to read these blocks one by one. The data analyzing unit reads the signature in each block of the input image data to identify the size of each block on the basis of the value of the signature thereof. The data analyzing unit repeatedly advances the data read position by the amount corresponding to the identified size until the signature indicative of the end of central directory record is read.

In this situation, the data analyzing unit determines whether the input image data is already stored in the storage device (step S22). If the input image data is not already stored in the storage device, the data analyzing unit controls the data acquiring unit to read data of one block from the communication buffer and to store the read data into the storage device (step S23). If the input image data is already stored in the storage device 4, the data analyzing unit controls the data acquiring unit to read the data of one block from the storage device (step S24). Then, the data analyzing unit determines whether the value of the signature of the read block matches one of the specific signature values (step S25).

If it has been determined that the value of the signature of the read block matches one of the specific signature values, the data analyzing unit determines that no format error has been generated in the block and interprets the block (step S26).

If the block that has been interpreted at step S26 is situated at the trailing end of the input image data, that is, the signature indicative of the end of central directory record is not read at step S23 or S24 (step S27), the data analyzing unit reads the next block from the communication buffer or the storage device (step S23 or S24) and executes the processes at step S25 and succeeding steps on the block so read.

If the interpretation of the input image data down to the last block thereof is completed without the generation of any format error, that is, the signature indicative of the end of central directory record is read at step S23 or S24 (step S27), execution of the data interpretation processing is terminated.

On the other hand, if it has been determined at step S25 that the value of the signature of the read block does not match any of the specific signature values, the data analyzing unit determines that a format error has been generated and determines whether the input image data is already stored in the storage device (step S28). If the input image data is not yet stored in the storage device, the data analyzing unit reads data of the remaining blocks from the communication buffer and stores the read data into the storage device (step S29). Then, the data analyzing unit generates a format error generation log and stores the log into the storage device or the memory (step S30). The format error generation log includes the type of the data format that the data analyzing unit from which the format error has been generated deals with. If the format error has been generated, execution of the data interpretation processing is terminated after recording of the format error generation log.

Thus, the processing of interpreting the input image data of the XPS format is executed.

Figure 6:
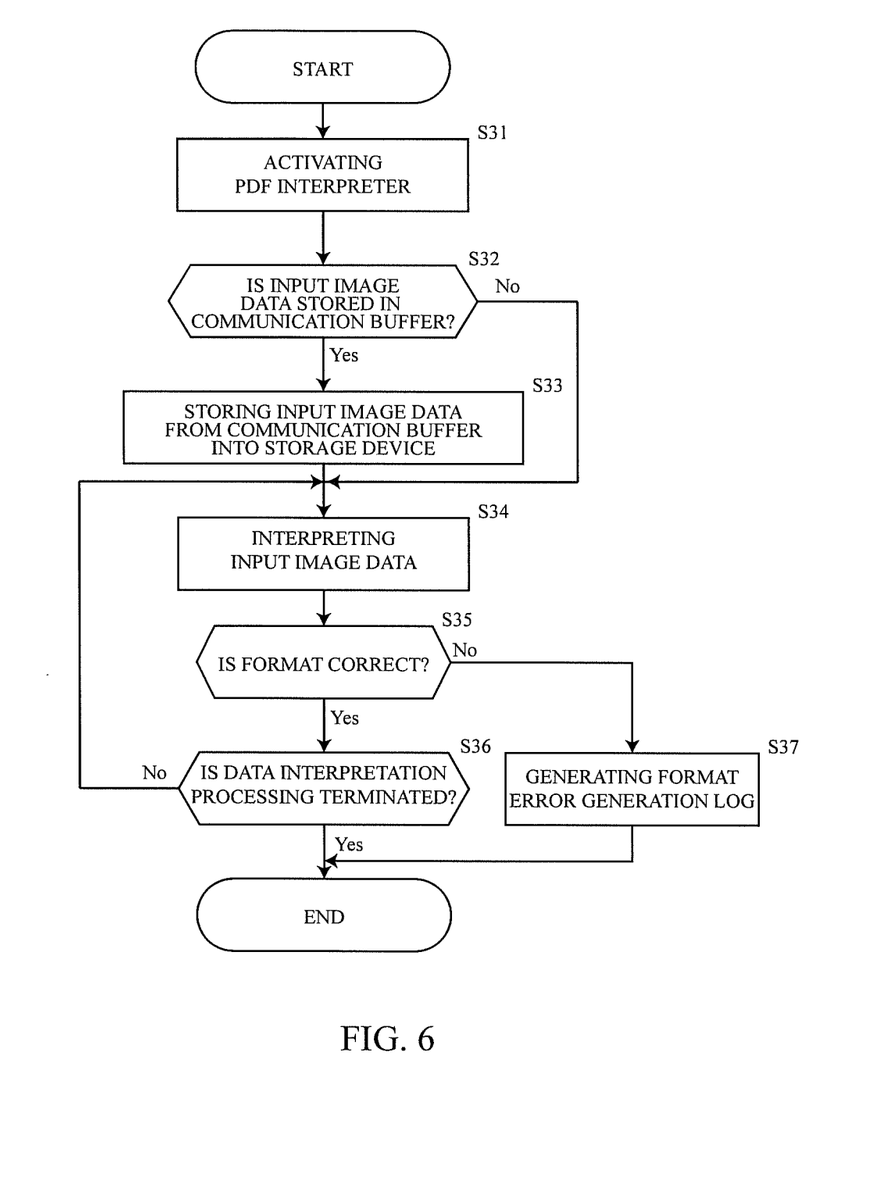
FIG. 6 shows a flowchart illustrating an example operation of a data analyzing unit for the PDF format in an image forming apparatus according to an embodiment of the present disclosure.

Next, the operation of the data analyzing unit for the PDF format will be described. FIG. 6 shows a flowchart illustrating an example operation of the data analyzing unit for the PDF format in an image forming apparatus according to an embodiment of the present disclosure.

The data analyzing unit activates a PDF interpreter (step S31) and causes the PDF interpreter to interpret the input image data. Next, the data analyzing unit determines whether the input image data is stored in the communication buffer (step S32). If the input image data is stored in the communication buffer, the data analyzing unit controls the data acquiring unit to read the input image data from the communication buffer and to store the read input image data into the storage device (step S33).

The data analyzing unit starts interpretation of the input image data (step S34) and monitors for generation of a format error (step S35) until interpretation of the input image data is terminated (step S36). When interpretation of the input image data down to the end thereof is completed without the generation of a format error, execution of the data interpretation processing is terminated.

On the other hand, if a format error has been generated, the data analyzing unit generates a format error generation log and stores the log into the storage device or the memory (step S37). If the format error has been generated, execution of the data interpretation processing is terminated after recording of the format error generation log.

Thus, the processing of interpreting the input image data of the PDF format is executed.

Figure 7:
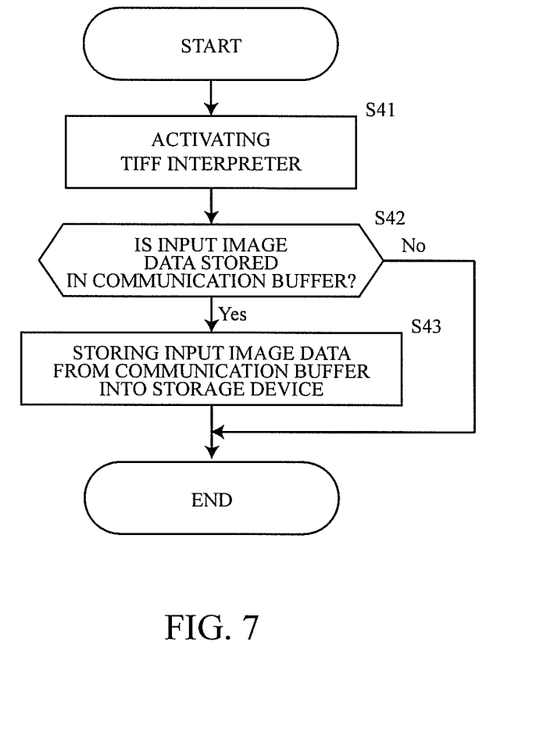
FIG. 7 shows a flowchart illustrating an example operation of a data analyzing unit for the TIFF format in an image forming apparatus according to an embodiment of the present disclosure.
Figure 8:
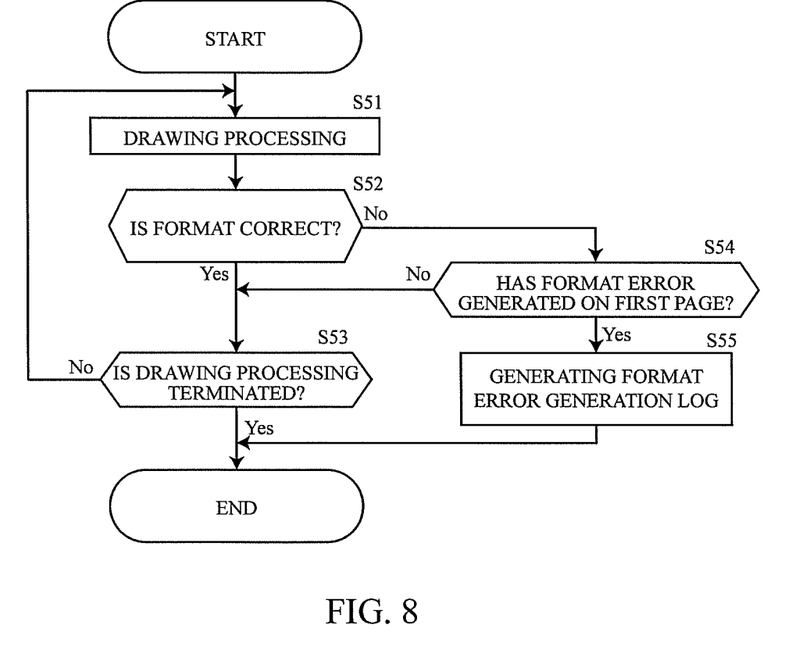
FIG. 8 shows a flowchart illustrating an example TIFF data drawing processing executed using a drawing processing unit in an image forming apparatus according to an embodiment of the present disclosure.

Next, the operation of the data analyzing unit for the TIFF format will be described. FIG. 7 shows a flowchart illustrating an example operation of the data analyzing unit for the TIFF format in an image forming apparatus according to an embodiment of the present disclosure. FIG. 8 shows a flowchart illustrating a drawing processing for the TIFF format that is executed using the drawing processing unit.

As illustrated in FIG. 7, the data analyzing activates a TIFF interpreter (step S41) and causes the TIFF interpreter to interpret the input image data. Next, the data analyzing unit determines whether the input image data is stored in the communication buffer (step S42). If the input image data is stored in the communication buffer, the data analyzing unit controls the data acquiring unit to read the input image data from the communication buffer and to store the read input image data into the storage device (step S43).

Then, as illustrated in FIG. 8, the drawing processing unit starts execution of the drawing processing on the basis of the data of the TIFF format (step S51) and monitors for generation of a format error (step S52) until execution of the drawing processing on the basis of bit map data in the input image data is terminated (step S53).

If a format error has been generated while the drawing processing is being executed, the drawing processing unit determines whether the format error has been generated on the first page of the input image data (step S54). If the format error has been generated on the first page, the drawing processing unit generates a format error generation log and stores the log into the storage device or the memory (step S55). On the other hand, if the format error has been generated on one of the second and succeeding pages, the drawing processing unit continues execution of the drawing processing. Image data corresponding to a plurality of pages may be included in the data for the TIFF format. Thus, only if the format error has been generated on the first page is the data format of the input image data determined not to be the TIFF format and the data format switched to another format.

Therefore, if the format error is not generated on the first page, execution of the drawing processing is terminated at the completion of the drawing processing for the input image data down to the end thereof.

Thus, the interpretation processing and the drawing processing for the input image data of the TIFF format are executed.

Figure 9:
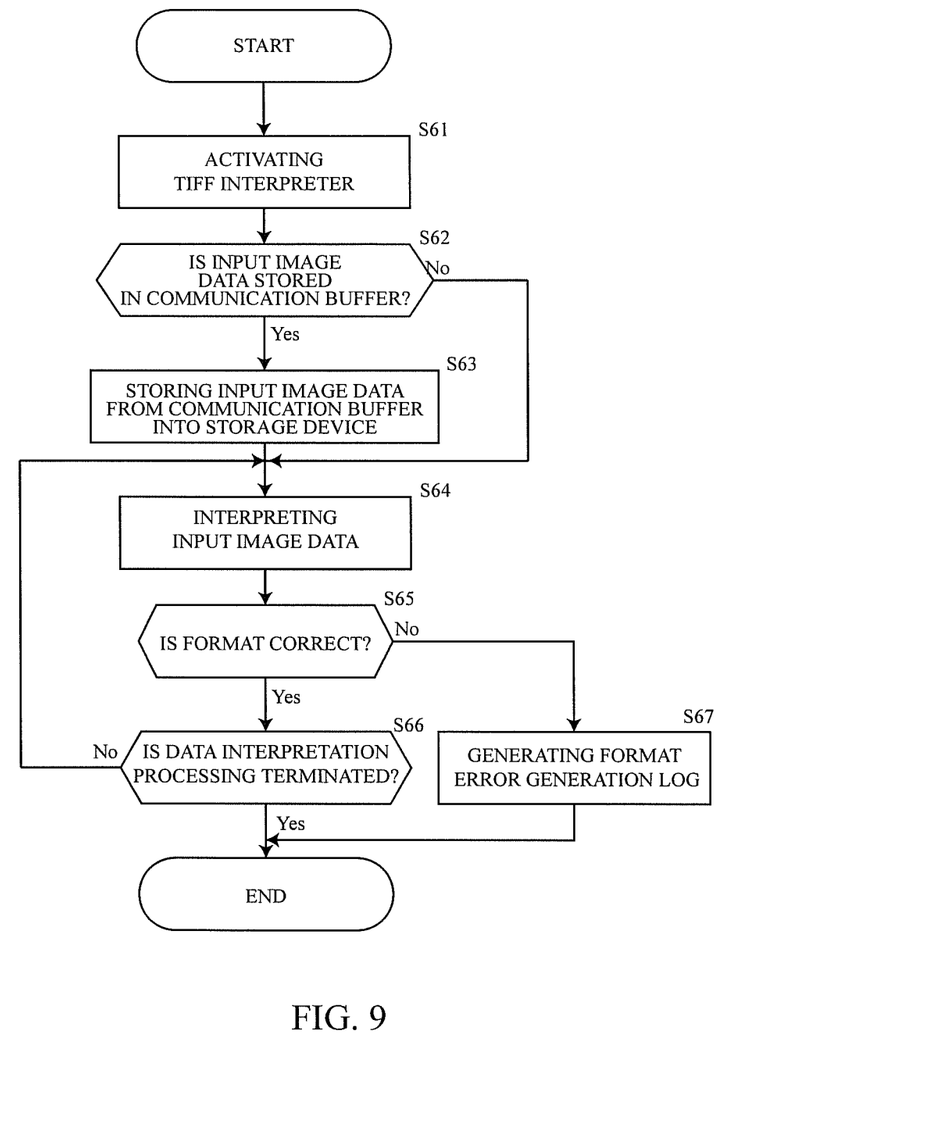
FIG. 9 shows a flowchart illustrating an example operation of a data analyzing unit for the JPEG format in an image forming apparatus according to an embodiment of the present disclosure.

Next, the operation of the data analyzing unit for the JPEG format will be described. FIG. 9 shows a flowchart illustrating an example operation of the data analyzing unit for the JPEG format in an image forming apparatus according to an embodiment of the present disclosure.

The data analyzing unit activates a JPEG interpreter (step S61) and causes the JPEG interpreter to interpret the input image data. Next, the data analyzing unit determines whether the input image data is stored in the communication buffer (step S62). If the input image data is stored in the communication buffer, the data analyzing unit controls the data acquiring unit to read the input image data from the communication buffer and to store the read data into the storage device (step S63).

The data analyzing unit starts interpretation of the input image data (step S64) and monitors for generation of a format error (step S65) until interpretation of the input image data is terminated (step S66). If interpretation of the input image data down to the end thereof is completed without the generation of a format error, execution of the data interpretation processing is terminated.

On the other hand, if the format error has been generated, the data analyzing unit generates a format error generation log and stores the log into the storage device or the memory (step S67). If the format error has been generated, execution of the data interpretation processing is terminated after recording of the format error generation log.

Thus, the interpretation processing for the input image data of the JPEG format is executed.

As described above, according to the embodiments, if the header part of the input image data matches the specific header code of one of the plurality of data formats, the data format determining unit causes the data analyzing unit corresponding to the data format for the specific header code to interpret the input image data. If a format error has been generated while the input image data is being processed using the data analyzing unit or the drawing processing unit, the data format determining unit causes another data analyzing unit of the plurality of data analyzing units to interpret the input image data.

Accordingly, even if the header part of the input image data is not correctly described or the header part is broken in the course of communication when the data format of the input image data is automatically identified on the basis of the input image data, the input image data may be interpreted using the plurality of data analyzing units. Therefore, the image forming apparatus according to the embodiments of the present disclosure may be capable of correctly identifying the data format of the input image data, thereby correctly interpreting the input image data. In addition, even if the header part of text data or binary data (that is, data that is not part of the input image data) to which the image forming apparatus does not conform unexpectedly matches the header part of the input image data to which the image forming apparatus conforms, the data may not be interpreted as the input image data. As a result, a large number of pages of meaningless data may be prevented from being printed and an unexpected malfunction may also be prevented.

Furthermore, the image forming apparatus may read the input image data from the communication buffer and store the read data into the storage device. Accordingly, by reading the input image data from the storage device, the input image data may be prevented from remaining in the communication buffer regardless of performance of a plurality of input image data interpreting operations.

While the above embodiments are examples of the present disclosure, the present disclosure is not limited to the embodiments and may be varied and altered in a variety of ways without departing from the gist of the disclosure.

For example, although in the embodiments, the input image data of four data formats may be used, the input image data of two, three, five or more data formats may also be used. In addition, input image data of data formats other than the four data formats described above may be also used.

In addition, although in the explanation of one of the embodiments, it is described that the data format determining unit specifies the data format for default as the data format of the input image data at step S10 in FIG. 3, execution of processing may be terminated instead.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus comprising:
   a plurality of data analyzing units configured to respectively interpret image data in accordance with different corresponding data formats;
   a drawing processing unit configured to execute a drawing process on the basis of a result of an interpretation executed using the plurality of data analyzing units;
   a data format determining unit configured to (i) determine an initial estimated data format of input image data, (ii) cause a particular data analyzing unit of the plurality of data analyzing units corresponding to the initial estimated data format to interpret the input image data, and (iii) cause another data analyzing unit of the plurality of data analyzing units to interpret the input image data responsive to a format error being generated while the input image data is being processed using the particular data analyzing unit or the drawing processing unit;
   a communication device configured to receive the input image data and to temporarily store the received input image data into a communication buffer; and a storage device configured to store the input image data; wherein:

the particular data analyzing unit is configured to read the input image data from the communication buffer, and then to store the input image data into the storage device;

others of the plurality of data analyzing units that interpret the input image data in second or succeeding turns are configured to read the input image data from the storage device; and when a format error has been generated while the particular data analyzing unit is firstly interpreting the input image data, the particular data analyzing unit (i) stops interpreting the input image data, (ii) reads a remaining part of the input image data stored in the communication buffer, and (iii) stores the read remaining part of the input image data into the storage device.

2. The image forming apparatus according to claim 1, wherein determining an initial estimated data format of the input image data comprises reading a header part of the input image data and matching a predetermined header code of one of the data formats with a corresponding code in the header part.

3. The image forming apparatus according to claim 1, wherein determining an initial estimated data format of the input image data comprises reading a header part of the input image data and failing to match a predetermined header code of one of the data formats with a corresponding code in the header part, and responsively accessing a stored history of past image data formats processed by the image forming apparatus, and based on the history, selecting one of the image data formats from the stored history as the initial estimated data format.

4. The image forming apparatus according to claim 1, wherein the particular data analyzing unit is configured to interpret image data of the XPS format.

5. The image forming apparatus according to claim 4, wherein the particular data analyzing unit is configured to interpret the image data of the XPS format by repeatedly reading a signature from the input image data, identifying a size of a block on the basis of the value of the signature, and advancing a data read position by an amount corresponding to the identified size until a signature indicative of End Of Central Directory Record is read, and is further configured to determine that the format error has been generated if the value of the signature does not match any of specific signature values.

6. The image forming apparatus according to claim 1, wherein the data format determining unit is configured to cause each of the data analyzing units in the plurality to interpret the input image data.

7. A non-transitory computer readable recording medium that stores print processing program code to be executed by a computer of an image forming apparatus, the print processing program code comprising:

first sub-program code for causing the computer to respectively interpret image data in accordance with a plurality of different data formats;

second sub-program code for causing the computer to execute a drawing process on the basis of a result of an interpretation executed using the first sub-program code; and third sub-program code for causing the computer to determine an initial estimated data format of input image data;

fourth sub-program code for causing the computer to interpret the input image data as a particular one of the plurality of different data formats in accordance with the initial estimated data format;

fifth sub-program code for causing the computer to interpret the input image data as another data format of the plurality of different data formats responsive to a format error being generated while the input image data is being processed as the particular data format by the first sub-program code or the second sub-program code;

sixth sub-program code for causing the computer to receive the input image data and to temporarily store the received input image data into a communication buffer; and seventh sub-program code for causing the computer to store the input image data into a storage device; wherein:

in a first interpretation of the input image data, the first sub-program code causes the computer to read the input image data from the communication buffer and to interpret the input image data as the particular one of the plurality of different data formats, and the seventh sub-program code causes the computer to store the input image data that is read from the communication buffer into the storage device;

in a second or succeeding interpretation of the input image data, the first sub-program code causes the computer to (i) read the input image data from the storage device and (ii) interpret the input image data as the other data format; and when a format error has been generated during the first interpretation of the input image data, the first sub-program code causes the computer to stop interpreting the input image data and the seventh sub-program code causes the computer to (i) read a remaining part of the input image data stored in the communication buffer and (ii) store the read remaining part of the input image data into the storage device.

8. The non-transitory computer readable recording medium according to claim 7, wherein the third sub-program code causes the computer to determine an initial estimated data format of the input image data by reading a header part of the input image data and matching a predetermined header code of one of the data formats with a corresponding code in the header part.

9. The non-transitory computer readable recording medium according to claim 7, wherein the third sub-program code causes the computer to determine an initial estimated data format of the input image data by reading a header part of the input image data and failing to match a predetermined header code of one of the data formats with a corresponding code in the header part, and responsively accessing a stored history of past image data formats processed by the image forming apparatus, and based on the history, selecting one of the image data formats from the stored history as the initial estimated data format.

10. The non-transitory computer readable recording medium according to claim 7, wherein:

the particular one of the data formats is the XPS format; and in interpreting the image data of the XPS format, the first sub-program code causes the computer to execute reading a signature from the input image data, identifying a size of a block on the basis of the value of the signature, and advancing a data read position by an amount corresponding to the identified size until a signature indicative of End Of Central Directory Record is read, and to determine that the format error has been generated if the value of the signature does not match any of specific signature values.

11. The non-transitory computer readable recording medium according to claim 7, wherein the first sub-program code causes the computer to interpret the input image data in accordance with each of the plurality of different data formats.

12. A print processing method comprising:
a plurality of data analyzing units respectively interpreting image data in accordance with different corresponding data formats;
a drawing processing unit executing a drawing process on the basis of a result of an interpretation executed using the plurality of data analyzing units; and
a data format determining unit (i) determining an initial estimated data format of input image data, (ii) causing a particular data analyzing unit of the plurality of data analyzing units corresponding to the initial estimated data format to interpret the input image data, and (iii) causing another data analyzing unit of the plurality of data analyzing units to interpret the input image data responsive to a format error being generated while the input image data is being processed using the particular data analyzing unit or the drawing processing unit;
a communication device receiving the input image data and temporarily storing the received input image data into a communication buffer; and
a storage device storing the input image data; wherein:
the particular data analyzing unit reads the input image data from the communication buffer and then stores the input image data into the storage device;
others of the plurality of data analyzing units that interpret the input image data in second or succeeding turns read the input image data from the storage device; and
when a format error has been generated while the particular data analyzing unit is firstly interpreting the input image data, the particular data analyzing unit (i) stops interpreting the input image data, (ii) reads a remaining part of the input image data stored in the communication buffer, and (iii) stores the read remaining part of the input image data into the storage device.

13. The method according to claim 12, wherein determining an initial estimated data format of the input image data comprises the data format determining unit reading a header part of the input image data and matching a predetermined header code of one of the data formats with a corresponding code in the header part.

14. The method according to claim 12, wherein determining an initial estimated data format of the input image data comprises the data format determining unit reading a header part of the input image data and failing to match a predetermined header code of one of the data formats with a corresponding code in the header part, and responsively accessing a stored history of past image data formats processed by the image forming apparatus, and based on the history, selecting one of the image data formats from the stored history as the initial estimated data format.

15. The print processing method according to claim 12, wherein the particular data analyzing unit is a data analyzing unit for interpreting image data of the XPS format; and
wherein the particular data analyzing unit repeatedly executes reading a signature from the input image data, identifying a size of a block on the basis of the value of the signature, and advancing a data read position by an amount corresponding to the identified size until a signature indicative of End Of Central Directory Record is read, and determines that the format error has been generated if the value of the signature does not match any of specific signature values.

16. The print processing method according to claim 12, further comprising the data format determining unit causing each of the data analyzing units in the plurality to interpret the input image data.

* * * * *